(12) United States Patent
Wang et al.

(10) Patent No.: US 11,509,503 B2
(45) Date of Patent: Nov. 22, 2022

(54) CIRCUIT MIGRATION SEQUENCE GENERATION FOR NETWORK MODERNIZATION

(71) Applicant: Fujitsu Limited, Kawasaki (JP)

(72) Inventors: Xi Wang, Murphy, TX (US); Nannan Wang, Allen, TX (US); Paparao Palacharla, Richardson, TX (US)

(73) Assignee: Fujitsu Limited, Kawasaki (JP)

(*) Notice: Subject to any disclaimer, the term of this patent is extended or adjusted under 35 U.S.C. 154(b) by 47 days.

(21) Appl. No.: 17/029,661

(22) Filed: Sep. 23, 2020

(65) Prior Publication Data
US 2022/0094571 A1 Mar. 24, 2022

(51) Int. Cl.
*H04L 12/50* (2006.01)
*H04L 12/28* (2006.01)
*H04L 12/64* (2006.01)
*H04L 67/1061* (2022.01)
*H04L 45/50* (2022.01)
*H04L 45/42* (2022.01)
*H04L 61/4541* (2022.01)

(52) U.S. Cl.
CPC .......... *H04L 12/50* (2013.01); *H04L 12/2801* (2013.01); *H04L 12/64* (2013.01); *H04L 45/42* (2013.01); *H04L 45/50* (2013.01); *H04L 61/4541* (2022.05); *H04L 67/1063* (2013.01)

(58) Field of Classification Search
CPC ..... H04L 12/50; H04L 12/2801; H04L 12/64; H04L 45/42; H04L 45/50; H04L 61/1541; H04L 67/1063
See application file for complete search history.

(56) References Cited

U.S. PATENT DOCUMENTS 9,369,338 B1 * 6/2016 Krishnaswamy ... H04L 41/0672
10,477,426 B1 * 11/2019 Tiwari ................ H04L 43/0852
2021/0099378 A1 * 4/2021 Alaettinoglu .......... H04L 41/16

* cited by examiner

*Primary Examiner* — Jamal Javaid
*Assistant Examiner* — Shawn D Miller
(74) *Attorney, Agent, or Firm* — Fujitsu Patent Center

(57) ABSTRACT

Disclosed methods for network modernization include obtaining a list of end-to-end circuits carried in a circuit-switched network, calculating, for each circuit, an early retirement credit (ERC) score and a circuit load factor (CLF) score, selecting, dependent on the ERC and CLF scores, a circuit to migrate to a new network, adding the selected circuit to a circuit migration sequence, and removing the circuit from the list. The ERC score represents the number of circuit-switching units on which no circuits would be carried and that would remain in the network following its removal. The CLF score represents an average number of circuits that would be carried on each circuit-switching unit currently traversed by the circuit following its removal. When two circuits have the highest ERC score, the circuit with the lowest CLF score is selected for migration. The method is repeated until the list is empty.

20 Claims, 10 Drawing Sheets

CIRCUIT MIGRATION SEQUENCE GENERATION FOR NETWORK MODERNIZATION

BACKGROUND

Field of the Disclosure

The present disclosure relates generally to network modernization and, more particularly, to systems and methods for generating circuit migration sequences for network modernization.

Description of the Related Art

Network operators around the world struggle to manage aging, and failing, networks. Some of these networks are decades-old time-division multiplexing (TDM) networks. In the upcoming years, many operators will invest heavily to modernize these networks. For example, in North America alone, approximately 35,000 aging Digital Cross-connect Systems (DCSs) may need to be replaced over the next 10-15 years.

Currently, network modernization projects are typically performed by executing per-site circuit migration. Using a per-site circuit migration approach, in which circuits are migrated at every site the circuits traverse, one site at a time, is not particularly efficient. Using this approach, at a given site, all circuits terminating and/or traversing the site are migrated from old equipment to new equipment. This procedure is repeated for the next site and the site after that, until the equipment at all sites on the network have been upgraded. Using this approach, if a circuit traverses ten different sites, the same circuit will be migrated ten times. This can be a very inefficient, as well as labor intensive and time consuming, process.

SUMMARY

In one aspect, a method for network modernization is disclosed. The method includes obtaining a first list of a plurality of end-to-end circuits carried in a circuit-switched network, the circuit-switched network spanning multiple nodes at which circuit-switching equipment resides, calculating, for each of the end-to-end circuits on the first list, a respective first early retirement credit (ERC) score representing a number of zero-fill circuit-switching units that would remain in the circuit-switched network as a result of removal of the end-to-end circuit, where a zero-fill circuit-switching unit is a circuit-switching unit on which no circuits are carried, selecting, dependent on the respective first ERC scores, a first one of the end-to-end circuits to migrate to a new network, the first end-to-end circuit having a highest first ERC score among the respective scores for each of the end-to-end circuits on the first list, adding the first end-to-end circuit to a circuit migration sequence for the circuit-switched network in a first position, and removing the first end-to-end circuit from the first list to produce an updated list of end-to-end circuits that would be carried in the circuit-switched network following removal of the first end-to-end circuit from the circuit-switched network.

In any of the disclosed embodiments, the method may include calculating, for each end-to-end circuit on the first list, a respective first circuit load factor (CLF) score representing an average number of circuits that would be carried on each circuit-switching unit currently traversed by the end-to-end circuit following removal of the end-to-end circuit. When two or more of the end-to-end circuits on the first list have the highest first ERC score, selecting the first one of the end-to-end circuits to migrate to the new network may include selecting the one of the two or more end-to-end circuits on the first list for which the respective first CLF score is lowest.

In any of the disclosed embodiments, the method may include calculating, for each end-to-end circuit on the updated list, a respective next ERC score representing a number of zero-fill circuit-switching units that would remain in the circuit-switched network as a result of removal of the end-to-end circuit, selecting, dependent on the respective next ERC scores, a next one of the end-to-end circuits to migrate to the new network, the next end-to-end circuit having a highest next ERC score among the respective scores for the end-to-end circuits, adding the next one of the end-to-end circuits to the circuit migration sequence for the circuit-switched network in a next position, and removing the next one of the end-to-end circuits from the updated list.

In any of the disclosed embodiments, the method may include calculating, for each end-to-end circuit on the updated list, a respective next CLF score representing an average number of circuits that would be carried on each circuit-switching unit currently traversed by the end-to-end circuit following removal of the end-to-end circuit. When two or more of the end-to-end circuits on the updated list have the highest next ERC score, selecting the next one of the end-to-end circuits to migrate to the new network may include selecting the one of the two or more end-to-end circuits on the updated list for which the respective next CLF score is lowest.

In any of the disclosed embodiments, the method may include repeating calculating, for each end-to-end circuit on the updated list, a respective next CLF score, selecting a next one of the end-to-end circuits to migrate to the new network, adding the next one of the end-to-end circuits to the circuit migration sequence, and removing the next one of the end-to-end circuits from the updated list until the updated list is empty.

In any of the disclosed embodiments, the method may include, for each end-to-end circuit in the circuit migration sequence and in order of their respective positions in the circuit migration sequence, replacing circuit-switching units in the end-to-end circuit with new circuit-switching equipment compatible with transmission protocols implemented in the new network, and connecting the new circuit-switching equipment to the new network.

In another aspect, a system for circuit migration sequence generation for network modernization is disclosed. The system includes a processor and memory media storing program instructions. When executed by the processor, the program instructions cause the processor to obtain a first list of a plurality of end-to-end circuits carried in a circuit-switched network, the circuit-switched network spanning multiple nodes at which circuit-switching equipment resides, to calculate, for each end-to-end circuit on the first list, a respective first early retirement credit (ERC) score representing a number of zero-fill circuit-switching units that would remain in the circuit-switched network as a result of removal of the end-to-end circuit, where a zero-fill circuit-switching unit is a circuit-switching unit on which no circuits are carried, to select, dependent on the respective first ERC scores, a first one of the end-to-end circuits to migrate to a new network, the first end-to-end circuit having a highest first ERC score among the respective scores for the end-to-end circuits on the first list, to add the first end-to-end circuit to a circuit migration sequence for the circuit-switched network in a first position, and to remove the first end-to-end circuit from the first list to produce an updated list of end-to-end circuits that would be carried in the circuit-switched network following removal of the first end-to-end circuit from the circuit-switched network.

In any of the disclosed embodiments, when executed by the processor, the program instructions further cause the processor to calculate, for each end-to-end circuit on the first list, a respective first circuit load factor (CLF) score representing an average number of circuits that would be carried on each circuit-switching unit currently traversed by the end-to-end circuit following removal of the end-to-end circuit. When two or more of the end-to-end circuits on the first list have the highest first ERC score, selecting the first one of the end-to-end circuits to migrate to the new network may include selecting the one of the two or more end-to-end circuits on the first list for which the respective first CLF score is lowest.

In any of the disclosed embodiments, when executed by the processor, the program instructions further cause the processor to calculate, for each end-to-end circuit on the updated list, a respective next ERC score representing a number of zero-fill circuit-switching units that would remain in the circuit-switched network as a result of removal of the end-to-end circuit, to select, dependent on the respective next ERC scores, a next one of the end-to-end circuits to migrate to the new network, the next end-to-end circuit having a highest next ERC score among the respective scores for the end-to-end circuits, to add the next one of the end-to-end circuits to the circuit migration sequence for the circuit-switched network in a next position, and to remove the next one of the end-to-end circuits from the updated list.

In any of the disclosed embodiments, when executed by the processor, the program instructions further cause the processor to calculate, for each end-to-end circuit on the updated list, a respective next CLF score representing an average number of circuits that would be carried on each circuit-switching unit currently traversed by the end-to-end circuit following removal of the end-to-end circuit. When two or more of the end-to-end circuits on the updated list have the highest next ERC score, selecting the next one of the end-to-end circuits to migrate to the new network may include selecting the one of the two or more end-to-end circuits on the updated list for which the respective next CLF score is lowest.

In any of the disclosed embodiments, when executed by the processor, the program instructions further cause the processor to repeat, until the updated list is empty, calculating, for each end-to-end circuit on the updated list, a respective next CLF score, selecting a next one of the end-to-end circuits to migrate to the new network, adding the next one of the end-to-end circuits to the circuit migration sequence, and removing the next one of the end-to-end circuits from the updated list.

In any of the disclosed embodiments, the circuit-switched network may implement time-division multiplexing, and the circuit-switching units may include digital cross-connect system (DCS) units.

In any of the disclosed embodiments, the new network may implement multiprotocol label switching.

In any of the disclosed embodiments, obtaining the first list of the plurality of end-to-end circuits carried in the circuit-switched network may include receiving information describing the plurality of end-to-end circuits carried in the circuit-switched network from an owner, operator, or user of the circuit-switched network.

In any of the disclosed embodiments, obtaining the first list of the plurality of end-to-end circuits carried in the circuit-switched network may include performing a network discovery operation targeting the circuit-switched network and creating the first list based on results of the network discovery operation.

In any of the disclosed embodiments, two or more of the multiple nodes spanned by the circuit-switched network may be co-located.

In any of the disclosed embodiments, at least two of the multiple nodes spanned by the circuit-switched network may reside at different physical locations.

BRIEF DESCRIPTION OF THE DRAWINGS

For a more complete understanding of the present invention and its features and advantages, reference is now made to the following description, taken in conjunction with the accompanying drawings, in which.

Figure 1:
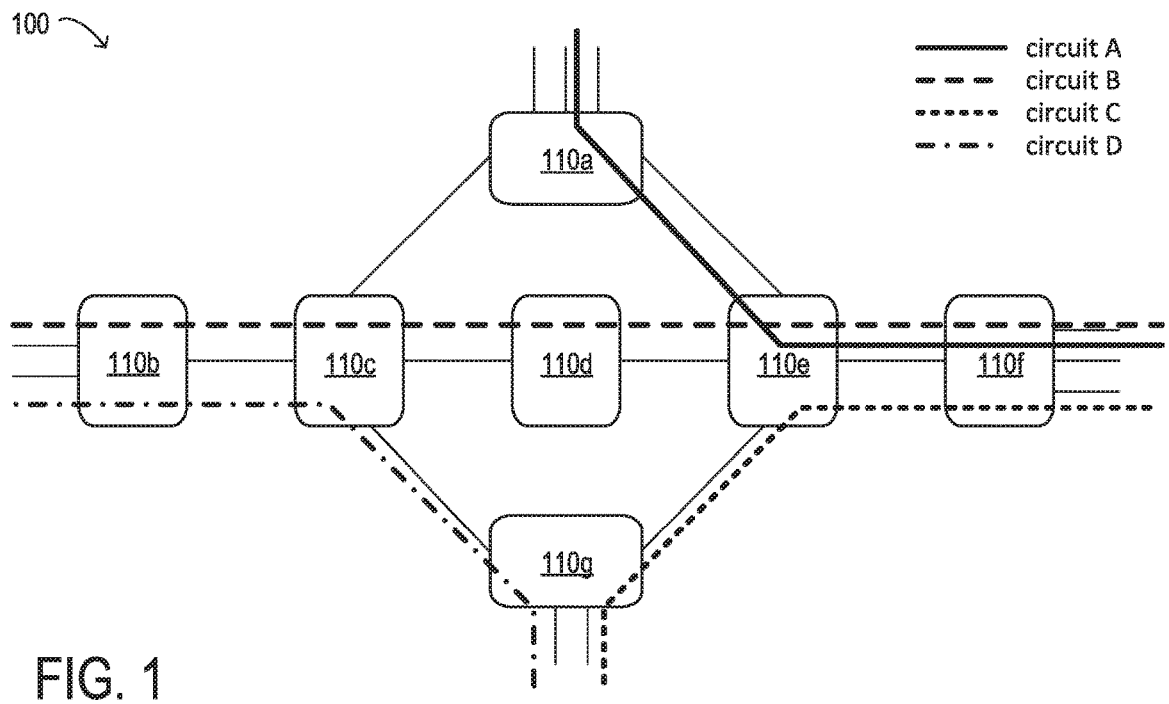
FIG. 1 is a block diagram illustrating selected elements of an example network on which network modernization is to be performed.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, per-site circuit migration, in which circuits are migrated at every site that the circuits traverse, one site at a time, is not a particularly efficient approach to performing a network modernization operation. As described in detail herein, the use of network level circuit migration of all end-to-end circuits, including at multiple traversed sites, between [A, Z] locations, may improve efficiency and reduce the overall migration time for a network modernization operation. The use of network level circuit migration may support the potential to decommission multiple circuit-switching units essentially in parallel, rather than one-by-one. In at least some embodiments, this approach may lead to a significant reduction in fiber or cable tracing, such that tracing is only needed at A/Z endpoints or sites, skipping intermediate circuit-switching locations. In addition, this approach may lead to a significant reduction in cut sheet and/or procedure generation by eliminating the need for these elements for intermediate circuit-switching units.

There are no existing solutions for generating network-wide circuit migration plans that enable efficient circuit migration at the network level. In order to best take advantage of the potential benefits of network level circuit migration, network modernization operations may employ intelligent techniques for the generation of circuit migration plans. Disclosed herein are such intelligent techniques for generating network-wide circuit migration sequences to enable efficient circuit migration at the network level.

Figure 2:
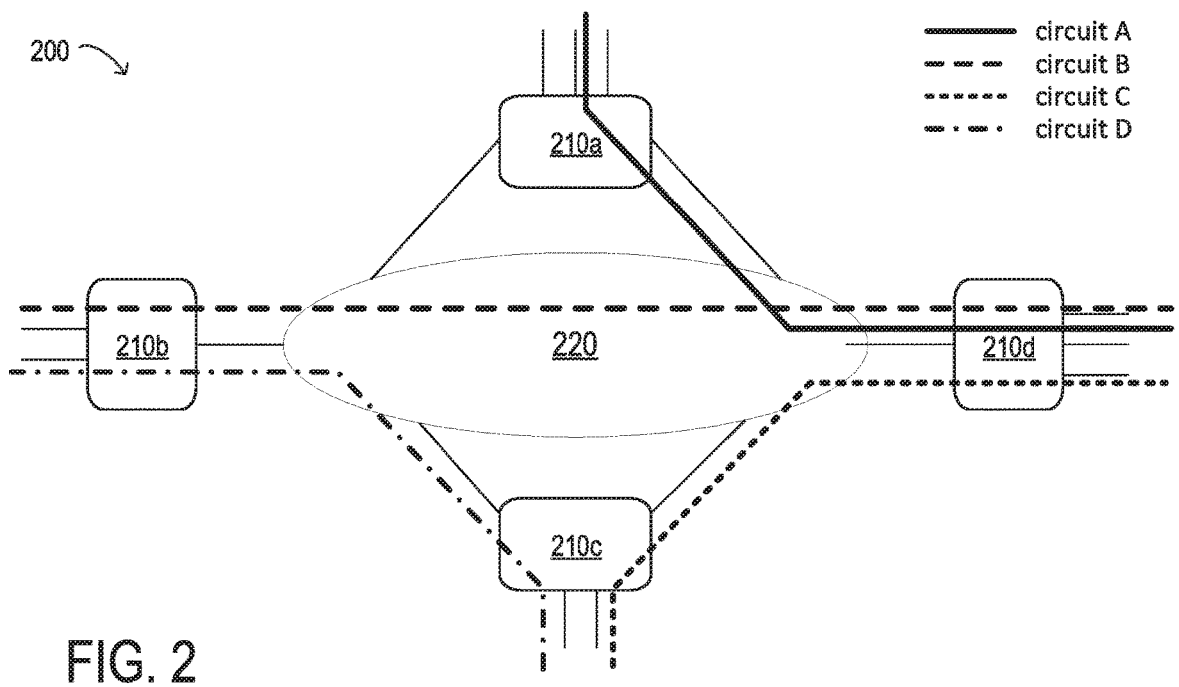
FIG. 2 is a block diagram illustrating selected elements of an example network resulting from the modernization of the example network shown in FIG. 1, according to one embodiment.

For example, FIG. 1 is a block diagram illustrating selected elements of an example network 100 on which network modernization is to be performed and FIG. 2 is a block diagram illustrating selected elements of an example network 200 resulting from the modernization of network 100 shown in FIG. 1, according to one embodiment.

For illustration purposes, the example network 100 shown in FIG. 1 is a simplistic network including only seven nodes 110 at which circuit-switching equipment, including one or more circuit-switching units, resides and on which four circuits, shown as circuits A, B, C, and D, are carried. More specifically, circuit A traverses nodes 110a, 110e, and 110f, circuit B traverses nodes 110b, 110c, 110d, 110e, and 110f, circuit C traverses nodes 110g, 110e, and 110f, and circuit D traverses nodes 110a, 110c, and 110g. In this illustrated example, network 100 may implement time-division multiplexing and the circuit-switching units at each node 110 may include digital cross-connect system (DCS) units.

In a network modernization operation, all circuits carried on a relatively old network implementation and existing, relatively old equipment are migrated to a newer network implementation and newer equipment. Following one such circuit migration exercise, the new network 200 illustrated in FIG. 2 implements a new network protocol (at 220) and includes new nodes 210 at which new network-switching equipment resides. In one example, network 200 implements multiprotocol label switching (MPLS) at 220 and includes four nodes 210 at which circuit-switching units suitable for use in a MPLS network, such as ingress routers (e.g., circuit-switching capable edge routers), circuit emulation-compatible label-switching routers, and/or egress routers, reside.

Described herein are techniques for migrating circuits away from old equipment in the most efficient way by creating a network-wide circuit migration plan. A circuit migration operation includes two major steps: 1) tearing down circuits carried on old equipment in an old network and 2) setting up new circuits on new equipment in a new network. For example, in step 1, in order to tear down circuits from the old equipment in the old network, a list of all existing end-to-end circuits carried on the old equipment in the old network may first be obtained. In some embodiments, obtaining the list of end-to-end circuits carried in the old network may include receiving information describing the end-to-end circuits from an owner, operator, or user of the network. In some embodiments, obtaining the list of end-to-end circuits carried in the old network may include performing, or initiating, a network discovery operation targeting the old network and creating the list of end-to-end circuits based on results of the network discovery operation. Once the list of existing circuits is obtained, a network-wide circuit migration plan may be created. This network-wide circuit migration plan includes a circuit migration sequence representing the order in which the end-to-end circuits are to be migrated from the old equipment in the old network to the new equipment in the new network.

In at least some embodiments, the efficiency of a circuit migration sequence may be evaluated in terms of how well it minimizes the overall Time to Zero-fill (TTZ) for the old network. With this metric in mind, the techniques described herein may be used to migrate end-to-end circuits away from as much old equipment as early as possible. For example, a given old circuit-switching unit becomes a zero-fill unit after all circuits carried by the given circuit-switching unit have been torn down, and the TTZ for the given circuit-switching unit represents its overall in-service time until it becomes a zero-fill unit. In at least some embodiments, an old circuit-switching unit will only be retired after it becomes a zero-fill unit. Therefore, by minimizing TTZ, the old equipment can be retired earlier. Retiring the old equipment as soon as possible has many potential technical benefits including reducing the risk of a service outage due to a failure of an old circuit-switching unit before it is replaced. Retiring the old equipment as soon as possible may also have positive business implications, such as reducing operating expenses and increasing revenue opportunities due to the new equipment requiring less electricity and HVAC services, fewer backup batteries, less shelf space, and thus lower facility rent, etc.

In the example network modernization operation illustrated in FIGS. 1 and 2, there are a total of twenty-four possible circuit migration sequences for migrating circuits A, B, C, and D from network 100 illustrated in FIG. 1 to network 200 illustrated in FIG. 2. The use of the TTZ metric in determining the efficiency of a circuit migration sequence is illustrated in FIGS. 3A through 3E and in FIGS. 4A through 4E, and described in detail below, with reference to two candidate circuit migration sequences from among the twenty-four possibilities. For example, FIGS. 3A through 3E illustrate the use of a first candidate circuit migration sequence for the example network 100 shown in FIG. 1, according to some embodiments. More specifically, these figures illustrate the use of a circuit migration sequence in which the end-to-end circuits are migrated in the following order: C, A, D, B. In this example, it is assumed that there is one circuit-switching unit residing at each node 110 in network 100 to be replaced as part of the network modernization operation.

Figure 3A:
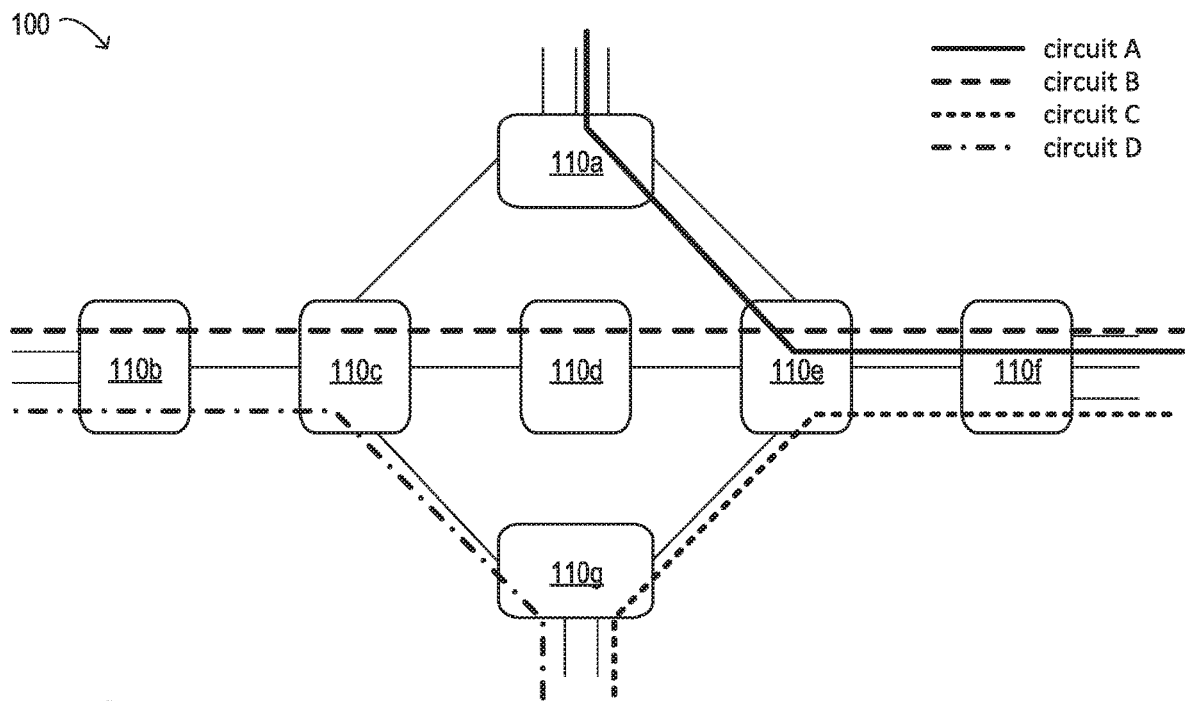
FIGS. 3A through 3E illustrate the use of a first candidate circuit migration sequence for the example network shown in FIG. 1, according to some embodiments.

FIG. 3A illustrates network 100 prior to performing a circuit migration exercise using the first candidate circuit migration sequence. At this point, which may be referred to as time 0, the initial number of circuit-switching units in service is seven, with one circuit-switching unit at each node 110.

Figure 3B:
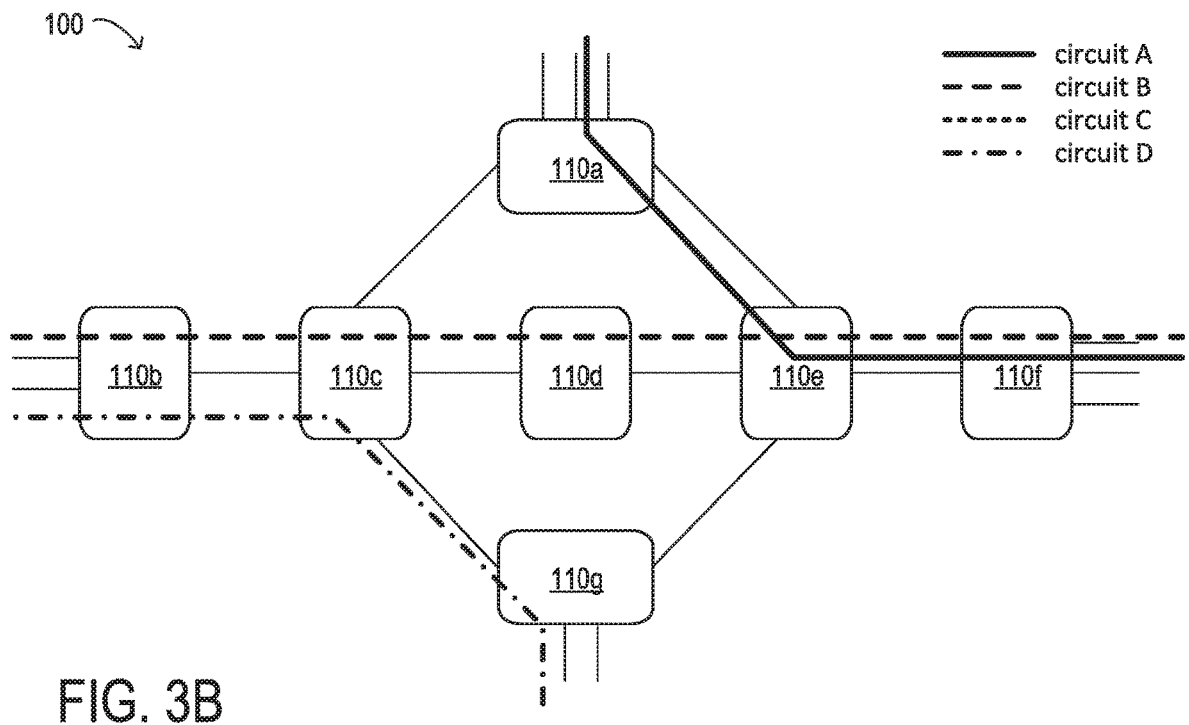

FIG. 3B illustrates network 100 after performing the first step in the first candidate circuit migration sequence, in which circuit C is removed from network 100. At this point, which may be referred to as time 1, the number of circuit-switching units in service is still seven, as none of the circuit-switching units have become zero-fill units as a result of the migration of circuit C.

Figure 3C:
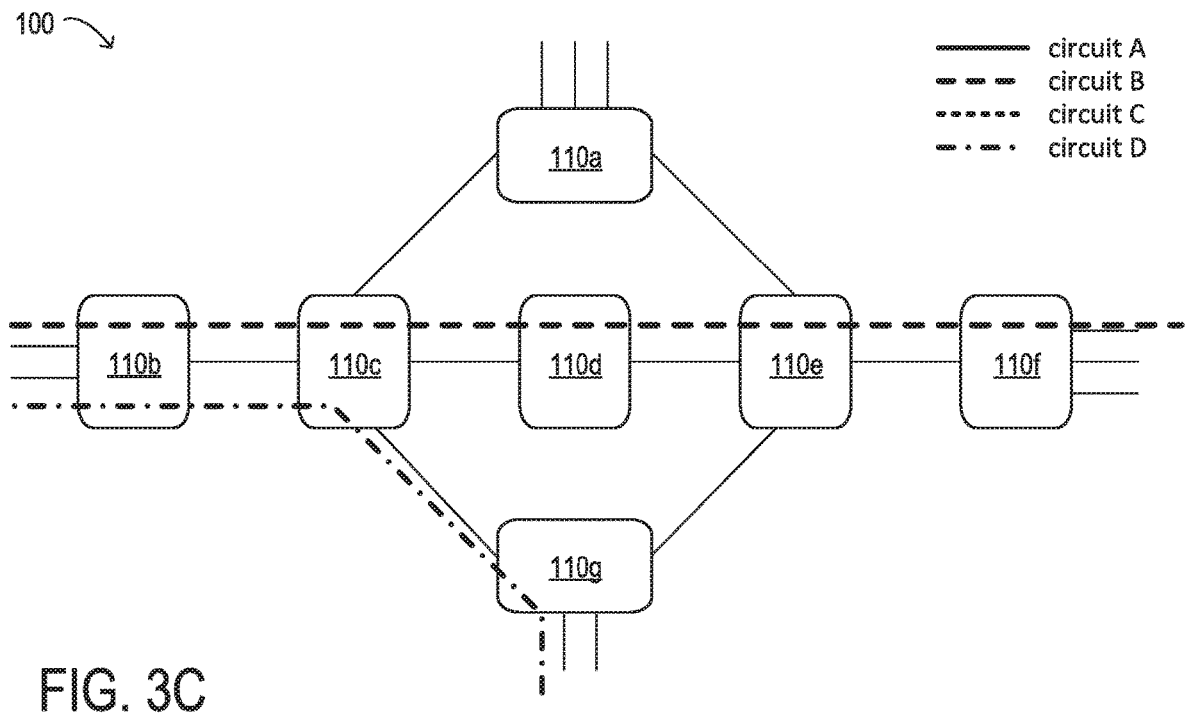

FIG. 3C illustrates network 100 after performing the second step in the first candidate circuit migration sequence, in which circuit A is removed from network 100. At this point, which may be referred to as time 2, the number of circuit-switching units in service is six, since the circuit-switching unit at node 110a has become a zero-fill unit as a result of the migration of circuit A.

Figure 3D:
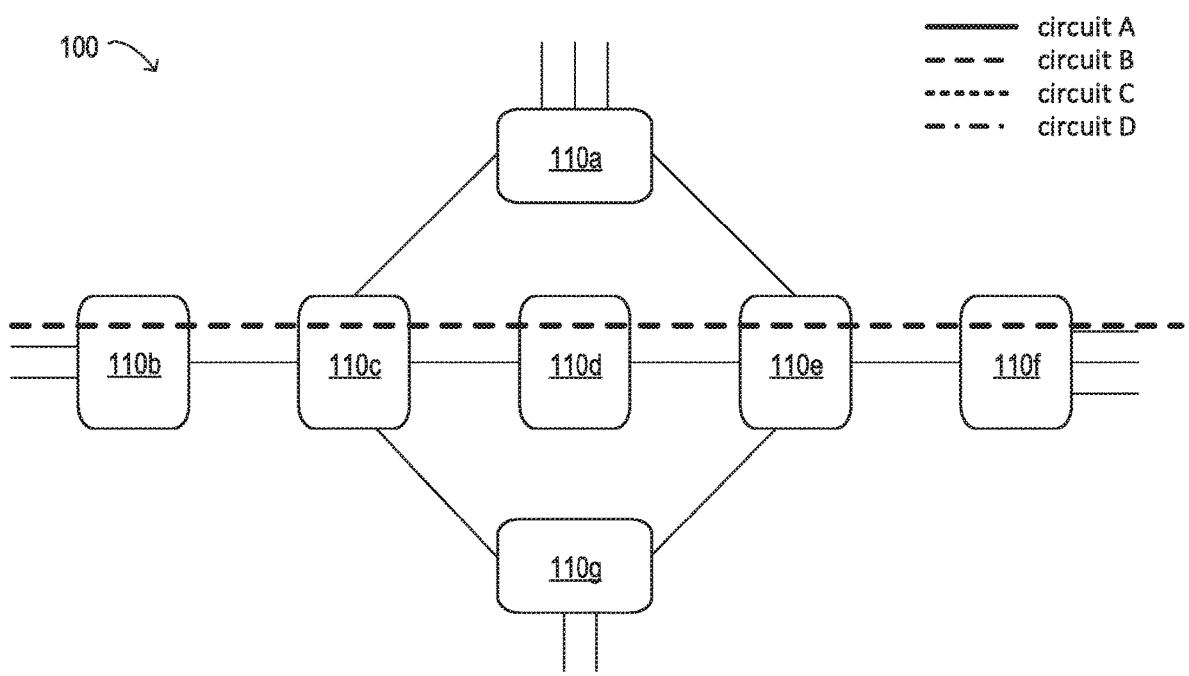

FIG. 3D illustrates network 100 after performing the third step in the first candidate circuit migration sequence, in which circuit D is removed from network 100. At this point, which may be referred to as time 3, the number of circuit-switching units in service is five, since the circuit-switching unit at node 110g has become a zero-fill unit as a result of the migration of circuit D.

Figure 3E:
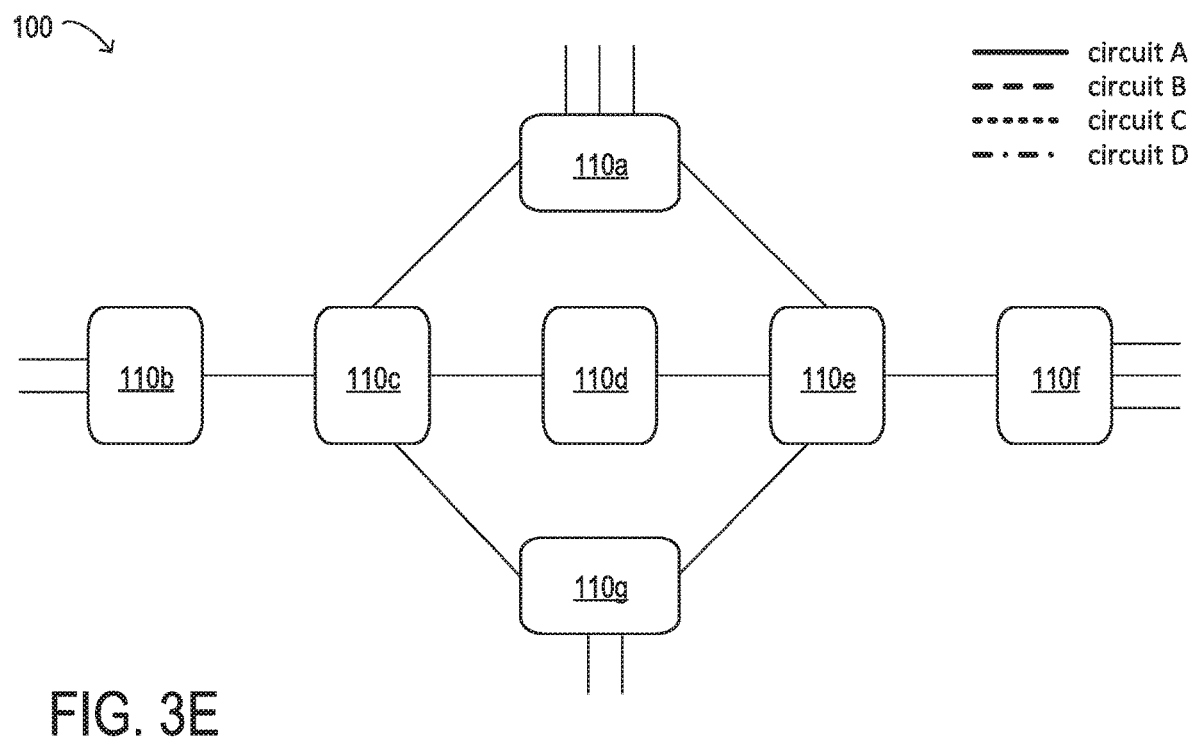

FIG. 3E illustrates network 100 after performing the fourth and final step in the first candidate circuit migration sequence, in which circuit B is removed from network 100. At this point, which may be referred to as time 4, the number of circuit-switching units in service is zero, since the circuit-switching units at nodes 110b, 110c, 110d, 110e, and 110f have become zero-fill units as a result of the migration of circuit B.

To calculate the overall TTZ for network 100 using this approach, the number of circuit-switching units in service following each step of the first circuit migration sequence are added together. This accumulation of in-service time for the old equipment corresponds to the TTZ for network 100. When using the example circuit migration sequence illustrated in FIGS. 3A through 3E, the total accumulated in-service time for the old equipment in network 100 (or TTZ)=7+6+5=18.

FIGS. 4A through 4E illustrate a second candidate network migration sequence for the example network 100 shown in FIG. 1, according to some embodiments. More specifically, these figures illustrate the use of a circuit migration sequence in which the end-to-end circuits are migrated in the following order: B, D, A, C. As in the previous example, it is assumed that there is one circuit-switching unit residing at each node 110 in network 100 to be replaced as part of the network modernization operation.

Figure 4A:
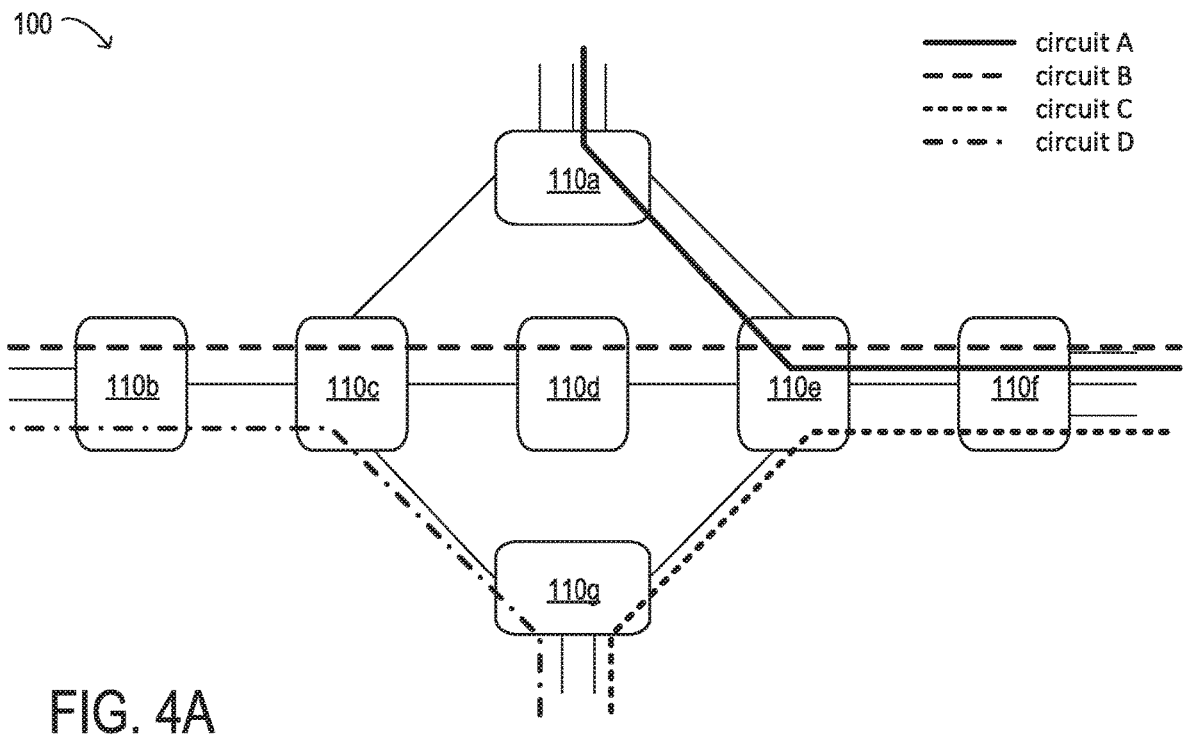
FIGS. 4A through 4E illustrate the use of a second candidate circuit migration sequence for the example network shown in FIG. 1, according to some embodiments.

FIG. 4A illustrates network 100 prior to performing a circuit migration exercise using the second candidate circuit migration sequence. At this point, which may be referred to as time 0, the initial number of circuit-switching units in service is seven, with one circuit-switching unit at each node 110.

Figure 4B:
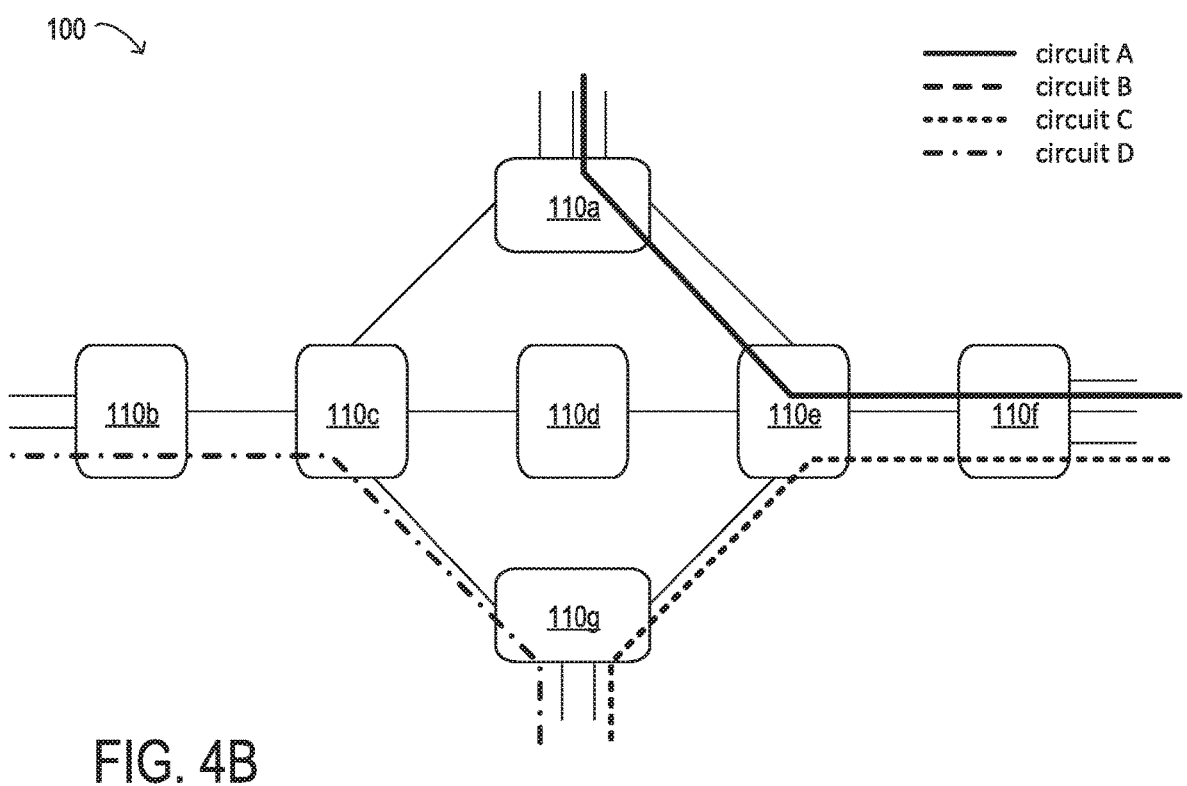

FIG. 4B illustrates network 100 after performing the first step in the second candidate circuit migration sequence, in which circuit B is removed from network 100. At this point, which may be referred to as time 1, the number of circuit-switching units in service is six, since the circuit-switching unit at node 110s has become a zero-fill unit as a result of the migration of circuit B.

Figure 4C:
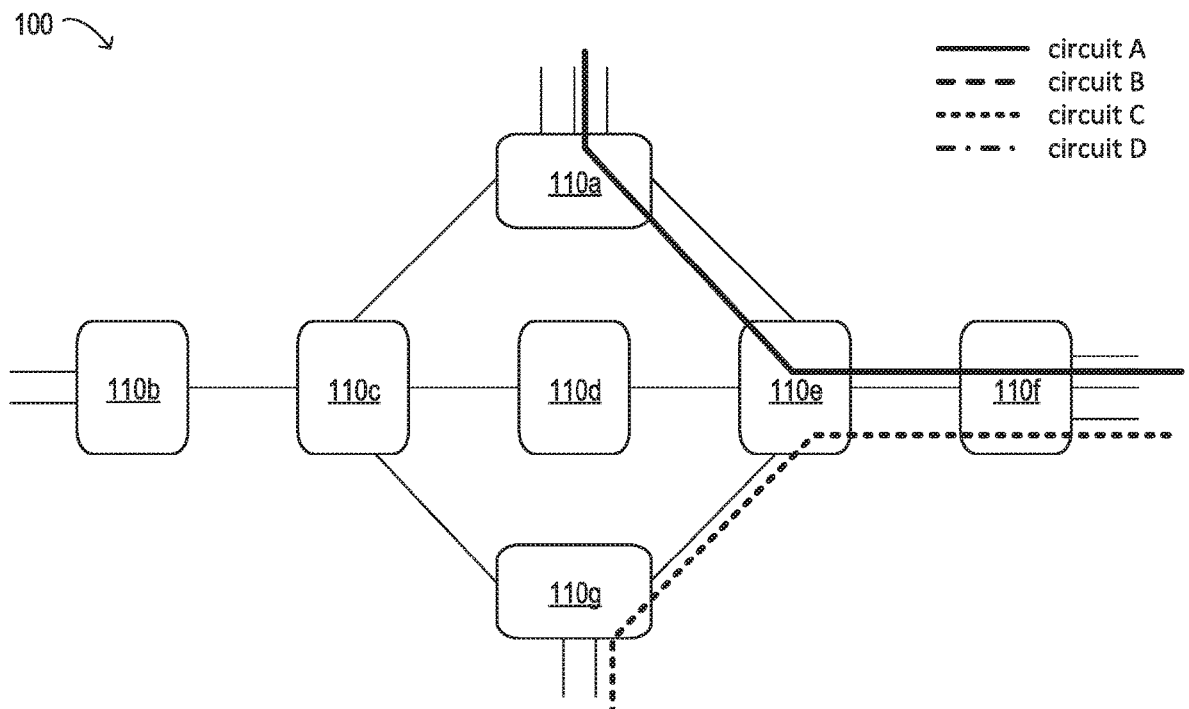

FIG. 4C illustrates network 100 after performing the second step in the second candidate circuit migration sequence, in which circuit D is removed from network 100. At this point, which may be referred to as time 2, the number of circuit-switching units in service is four, since the circuit-switching units at nodes 110b and 110c have become zero-fill units as a result of the migration of circuit D.

Figure 4D:
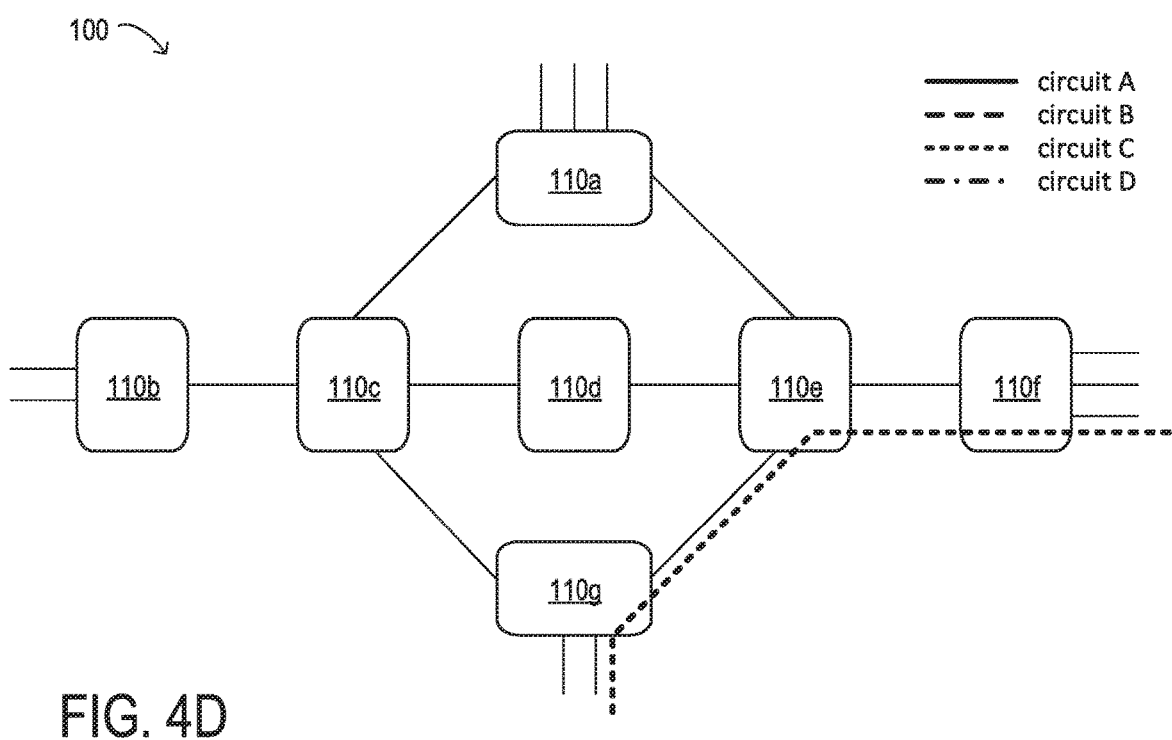

FIG. 4D illustrates network 100 after performing the third step in the second candidate circuit migration sequence, in which circuit A is removed from network 100. At this point, which may be referred to as time 3, the number of circuit-switching units in service is three, since the circuit-switching units at nodes 110a has become a zero-fill unit as a result of the migration of circuit A.

Figure 4E:
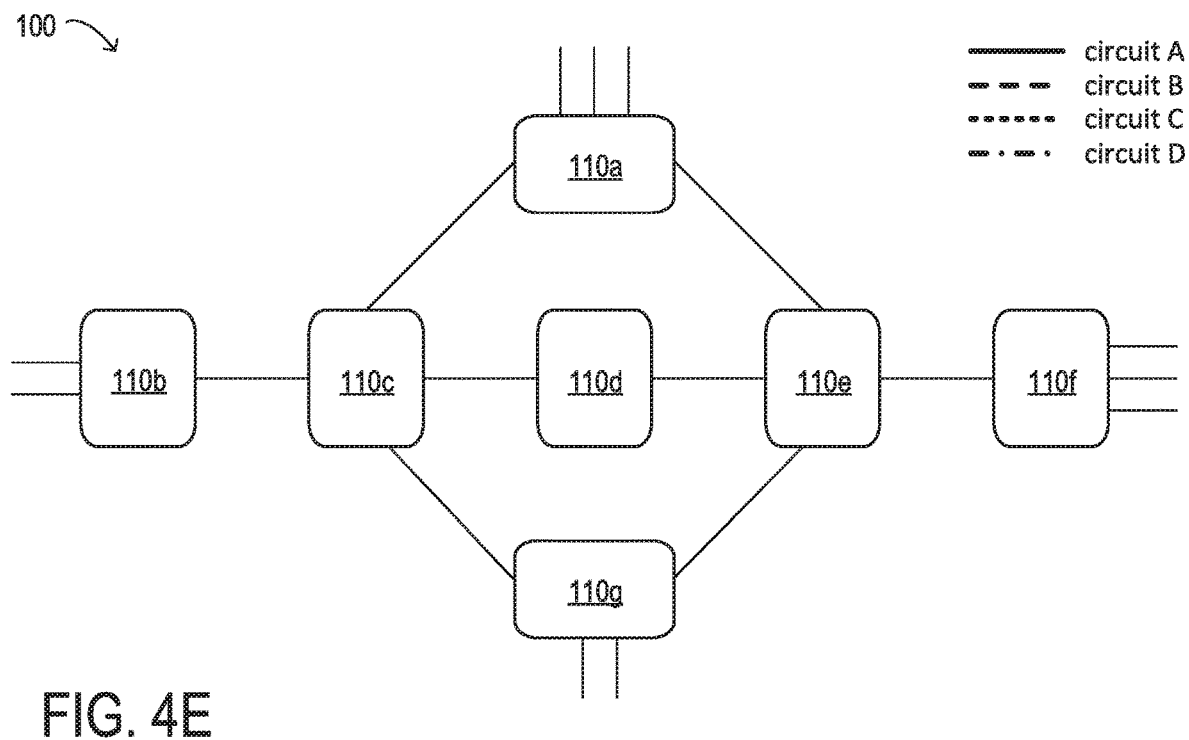

FIG. 4E illustrates network 100 after performing the fourth and final step in the second candidate circuit migration sequence, in which circuit C is removed from network 100. At this point, which may be referred to as time 4, the number of circuit-switching units in service is zero, since the circuit-switching units at nodes 110e, 110f, and 110g have become zero-fill units as a result of the migration of circuit C.

To calculate the overall TTZ for network 100 using this approach, the number of circuit-switching units in service following each step of the second circuit migration sequence are added together. This accumulation of in-service time for the old equipment corresponds to the TTZ for network 100. When using the example circuit migration sequence illustrated in FIGS. 4A through 4E, the total accumulated in-service time for the old equipment in network 100 (or TTZ)=6+4+3=13.

Compared to the first candidate circuit migration sequence, with a TTZ of 18, the use of the second candidate circuit migration sequence, with a TTZ of 13, would reduce the overall TTZ for migrating the old equipment in network 100 by 28%, resulting in a much more efficient network modernization operation. However, the challenge, especially for modernization of networks having hundreds or thousands of circuit-switching units at hundreds or thousands of sites, is identifying the best circuit migration sequence solutions from what may be considered an astronomical search space. Performing an exhaustive search over all possible circuit migration sequences to identify the circuit migration sequence with the lowest TTZ, in such large networks, may be prohibitive from the standpoint of computational complexity, compute resource requirements, and/or time constraints.

Disclosed herein are new techniques for generating circuit migration sequences for an existing network of any size and with any circuit count. In at least some embodiments, these techniques may be used to minimize the overall in-service time (i.e., the network-wide TTZ) of the old network equipment being replaced until the completion of all circuit migrations in the network. The circuit migration sequence generation techniques described herein may evaluate all end-to-end circuits carried in an old network based on two newly introduced metrics: 1) an Early Retirement Credit (ERC) score and 2) a Circuit Load Factor (CLF) score.

The ERC score for a given end-to-end score in the old network may represent the number of zero-fill circuit-switching units that would remain in the given network as a result of removal of the end-to-end circuit, where a zero-fill circuit-switching unit is a circuit-switching unit on which no circuits are carried. For example, if the removal of a particular end-to-end circuit would result in two circuit-switching unit becoming zero-fill units, the ERC score for the particular circuit would be calculated as 2. If the particular circuit has the highest ERC score from among all end-to-end circuits, this may indicate that removal of the particular circuit would allow the highest number of circuit-switching units to be retired immediately. Therefore, the removal of the particular circuit would make the highest contribution to the reduction of the overall TTZ.

The CLF score for a given end-to-end circuit represents the average number of circuits that would be carried on each circuit-switching unit currently traversed by the end-to-end circuit following removal of the end-to-end circuit, and is calculated as the average circuit load of all circuit-switching units that the given circuit currently traverses following its removal. For example, a particular circuit may traverse two circuit-switching units, referred to as circuit-switching unit 1 and circuit-switching unit 2. If, following removal of the particular circuit, circuit-switching unit 1 still carries 2 circuits and circuit-switching unit 2 still carries 3 circuits, the CLF score for the particular circuit would be calculated as (2+3)/2=2.5. If a particular circuit has a relatively low CLF score, this may suggest that its removal would lead to higher chance that the circuit-switching units previously traversed by the particular circuit will become zero-fill units in early future steps. Therefore, the removal of the particular circuit may contribute more to the potential reduction of overall TTZ than would a circuit with a higher CLF score.

In at least some embodiments, each end-to-end circuit in a given network may be evaluated with respect to both its ERC score and its CLF score, with the ERC score acting as the primary metric used in determining the most efficient circuit migration sequence and the CLF score acting as a secondary metric. In determining the ERC and CLF scores for all end-to-end circuits, each circuit may essentially go through a trial removal to check the potential merit of its removal. The circuit with highest ERC score may be chosen to be removed first. If multiple circuits share the same highest ERC score, the circuit with lowest CLF score among those with the same highest ERC score may be chosen to be removed first.

Figure 5:
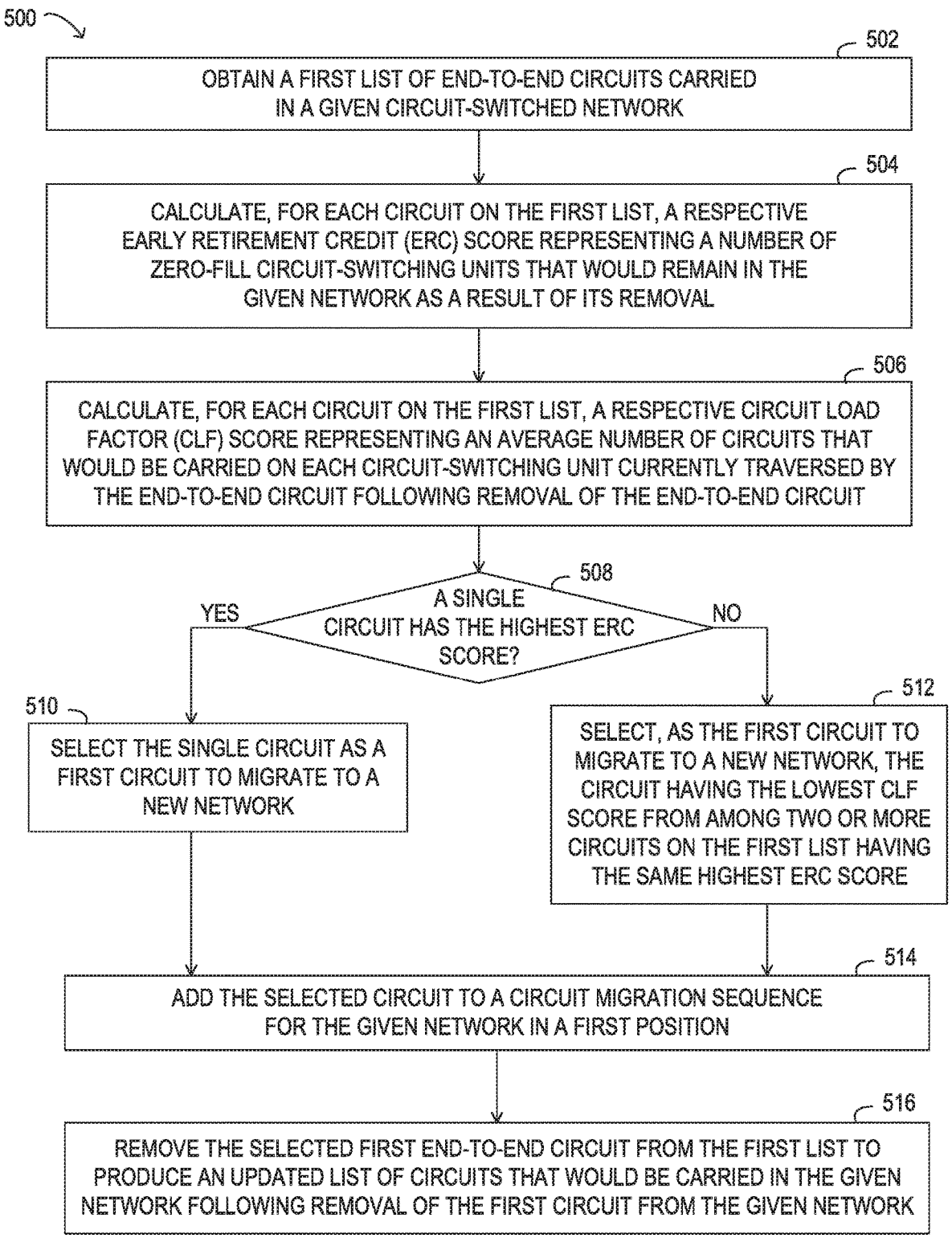
FIG. 5 is a flow diagram illustrating selected elements of an example method for circuit migration sequence generation for network modernization, according to some embodiments.

FIG. 5 is a flow diagram illustrating selected elements of an example method 500 for circuit migration sequence generation for network modernization, according to some embodiments. In some embodiments, one or more of the operations shown in FIG. 5 may be performed by a network management controller, such as network management controller 700 illustrated in FIG. 7. In some embodiments, the network management controller may be implemented as a computer system owned or operated by a network management service provider that provides network modernization services or that provides circuit migration sequences for use in network modernization operations using the techniques described herein.

In the illustrated example, method 500 includes, at 502, obtaining a first list of a plurality of end-to-end circuits carried in a given circuit-switched network. The given circuit-switched network may span multiple nodes at which circuit-switching equipment resides. In some embodiments, two or more of the multiple nodes spanned by the given circuit-switched network may be co-located. For example, two or more of the nodes may reside at the same site or in a same facility or portion thereof. In some embodiments, at least two of the multiple nodes spanned by the given circuit-switched network may reside at different physical locations. For example, two or more of the nodes may reside in different cities, at different sites, or in different facilities or portions thereof.

In some embodiments, obtaining the first list of the plurality of end-to-end circuits carried in the given circuit-switched network may include receiving information describing the plurality of end-to-end circuits carried in the given circuit-switched network from an owner, operator, or user of the given circuit-switched network. In some embodiments, obtaining the first list of the plurality of end-to-end circuits carried in the given circuit-switched network may include performing, or initiating, a network discovery operation targeting the given circuit-switched network and creating the first list based on results of the network discovery operation.

Method 500 also includes, at 504, calculating, for each of the end-to-end circuits on the first list, a respective first early retirement credit (ERC) score representing a number of zero-fill circuit-switching units that would remain in the given circuit-switched network as a result of removal of the end-to-end circuit, where a zero-fill circuit-switching unit is a circuit-switching unit on which no circuits are carried.

Method 500 also includes, at 508, calculating, for each of the end-to-end circuits on the first list, a respective first circuit load factor (CLF) score representing an average number of circuits that would be carried on each circuit-switching unit currently traversed by the end-to-end circuit following removal of the end-to-end circuit from the given circuit-switched network.

If, at 508, there is a single the end-to-end circuit on the first list that has the highest ERC score among all end-to-end circuits on the first list, method 500 continues at 510. Otherwise, the method proceeds to 512.

At 510, method 500 includes selecting the single circuit as the first end-to-end circuit to migrate to a new network.

At 512, the method includes selecting, as the first end-to-end circuit to migrate to a new network, the end-to-end circuit having the lowest CLF score from among two or more end-to-end circuit on the first list having the same highest ERC score.

At 514, method 500 includes adding the selected end-to-end circuit to a circuit migration sequence for the given switched-circuit network in the first position in the sequence.

At 516, the method includes removing the selected first end-to-end circuit from the first list to produce an updated list of circuits that would be carried in the given switched-circuit network following removal of the selected first end-to-end circuit from the given switched-circuit network.

Note that method 500 illustrated in FIG. 5 is an example embodiment and that in other embodiments, a method for circuit migration sequence generation for network modernization may include more, fewer, or different operations, including operations performed in an order different than that illustrated in FIG. 5. In at least some embodiments, the operations shown in FIG. 5 may be repeated until the updated list of circuits is empty, as shown in FIG. 6 and described in detail below.

In at least some embodiments, by iteratively evaluating the ERC and CLF scores of all end-to-end circuits in an existing network when generating a circuit migration sequence for a network modernization operation, the network-wide TTZ for the existing network may be minimized, resulting in improved efficiency, fewer equipment failures, and reduced circuit migration time for the network modernization operation. An example of this iterative process is illustrated in FIG. 6 and described below.

Figure 6:
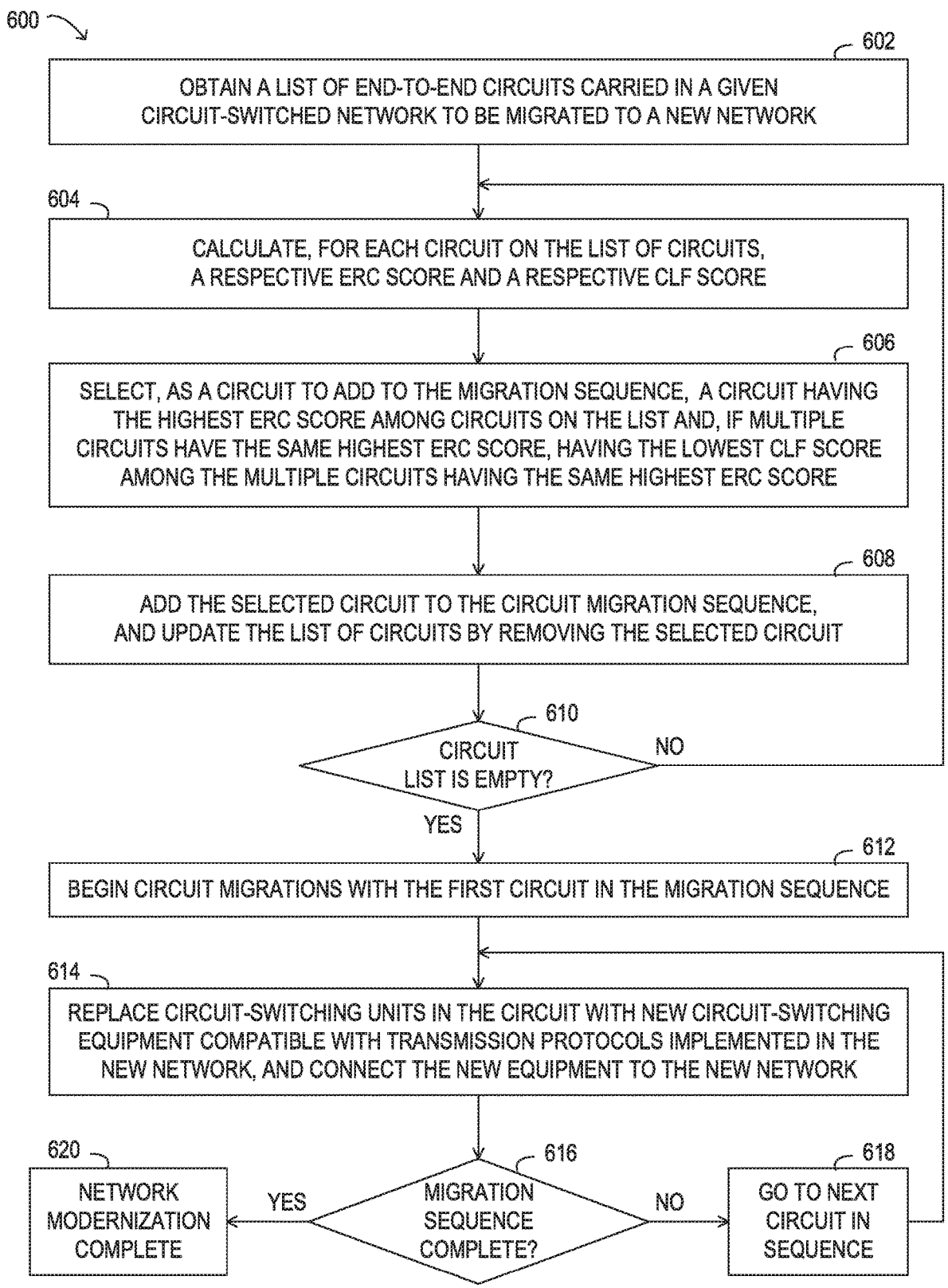
FIG. 6 is a flow diagram illustrating selected elements of an example method for automatically generating a circuit migration sequence for modernizing an existing network, according to some embodiments.

FIG. 6 is a flow diagram illustrating selected elements of an example method 600 for automatically generating a circuit migration sequence for modernizing an existing network, according to some embodiments. In some embodiments, one or more of the operations shown in FIG. 6 may be performed by a network management controller, such as network management controller 700 illustrated in FIG. 7. In some embodiments, the network management controller may be implemented as a computer system owned or operated by a network management service provider that provides network modernization services or that provides circuit migration sequences for use in network modernization operations using the techniques described herein. In the illustrated example, method 600 includes, at 602, obtaining a list of end-to-end circuits carried in a given circuit-switched network to be migrated to a new network. For example, the list of end-to-end circuits carried in the given circuit-switched network may be targeted for migration to a new network as part of a network modernization operation.

The given circuit-switched network may span multiple nodes at which circuit-switching equipment resides. In some embodiments, two or more of the multiple nodes spanned by the given circuit-switched network may be co-located. For example, two or more of the nodes may reside at the same site or in a same facility or portion thereof. In some embodiments, at least two of the multiple nodes spanned by the given circuit-switched network may reside at different physical locations. For example, two or more of the nodes may reside in different cities, at different sites, or in different facilities or portions thereof.

In some embodiments, obtaining the list of the plurality of end-to-end circuits carried in the given circuit-switched network may include receiving information describing the end-to-end circuits carried in the given circuit-switched network from an owner, operator, or user of the given circuit-switched network. In some embodiments, obtaining the first list of the plurality of end-to-end circuits carried in the given circuit-switched network may include performing, or initiating, a network discovery operation targeting the given circuit-switched network and creating the first list based on results of the network discovery operation.

In the illustrated example, the method includes, at 604, calculating, for each circuit on the list of circuits, a respective ERC score and a respective CLF score, as described herein. For example, the respective ERC score represents a number of zero-fill circuit-switching units that would remain in the given circuit-switched network as a result of removal of the end-to-end circuit, where a zero-fill circuit-switching unit is a circuit-switching unit on which no circuits are carried, and the respective CLF score represents an average number of circuits that would be carried on each circuit-switching unit currently traversed by the end-to-end circuit following removal of the end-to-end circuit from the given circuit-switched network.

At 606, method 600 includes selecting, as a circuit to add to a circuit migration sequence for the network modernization operation, a circuit having the highest ERC score among circuits on the list and, if multiple circuits have the same highest ERC score, having the lowest CLF score among the multiple circuits having the same highest ERC score.

At 608, the method includes adding the selected circuit to the circuit migration sequence and updating the list of circuits by removing the selected circuit.

If, at 610, the circuit list is empty following the operation at 608, the method includes returning to 604, after which the operations shown as 604 through 608 may be repeated until the circuit list is empty. However, if, or once, the circuit list is empty, method 600 may continue at 612.

At 612, the method includes beginning the migration of the end-to-end circuits carried in the given switched network to the new network with the first end-to-end circuit in the migration sequence. This includes, at 614, replacing the circuit-switching units in the first end-to-end circuit with new circuit-switching equipment compatible with transmission protocols implemented in the new network and connecting the new equipment to the new network. In one example, the given circuit-switched network implements time-division multiplexing, the circuit-switching units in the given circuit-switched network include digital cross-connect system (DCS) units, and the new network implements multiprotocol label switching. In other embodiments, other combinations of existing networks, new networks, and circuit-switching equipment are possible and supported by the techniques described herein.

If, at 616, the circuit migration sequence is not yet complete, the method includes proceeding to the next end-to-end circuit in the circuit migration sequence, as in 618, and returning to 614. As illustrated in FIG. 6, the operations shown at 614 may be repeated for each additional end-to-end circuit in the circuit migration sequence until the circuit migration sequence is complete. If and when, as 616, the circuit migration sequence is complete, method 600 proceeds to 620, where the network modernization operation is complete.

Note that method 600 illustrated in FIG. 6 is an example embodiment and that in other embodiments, a method for automatically generating a circuit migration sequence for modernizing an existing network may include more, fewer, or different operations, including operations performed in an order different than that illustrated in FIG. 6.

In some embodiments, at least some of the operations of method 500 illustrated in FIG. 5 and/or method 600 illustrated in FIG. 6 may be performed by a software tool executed as part of, or in support of, a network modernization operation carried out by a network management service provider. For example, a circuit migration sequence generator may include program instructions that when executed by a processor perform at least some of the operations of method 500 illustrated in FIG. 5 and/or method 600 illustrated in FIG. 6 to generate a circuit migration sequence specifying an order in which end-to-end circuits of an existing network to efficiently perform a network modernization operation. In some embodiments, the circuit migration sequence generator may output a circuit migration sequence that minimizes the overall TTZ for the existing network. In some embodiments, a migration sequence generator may produce a tabular output listing each of the end-to-end circuits, along with their corresponding ERC and CLF scores and an accumulated TTZ score.

For example, a portion of an example migration sequence generator output for network 100 illustrated in FIGS. 1, 3A-3E and 4A-4E is shown below. In this example, the migration sequence generator was configured to identify one end-to-end circuit for removal per step. The migration sequence generator identified an optimal circuit migration sequence as B, D, C, A in only 67 ms.

Network.generateCircuitMigrationPlan: numCircuitsMigrationPerStep=1

Network.generateCircuitMigrationPlan: Step=0 numInServiceNodes=7

Network.findMinTtzCircuitCandidates: bestCircuitCandidates=[B] ERC=1 CLF=1.2

Network.generateCircuitMigrationPlan: Step=1 migrateCircuits=[B]

numInServiceNodes=6 totalAccumulatedInServceTime (TTZ)=6

Network.findMinTtzCircuitCandidates: bestCircuitCandidates=[D] ERC=2

CLF=0.3333333333333333

Network.generateCircuitMigrationPlan: Step=2 migrateCircuits=[D]

numInServiceNodes=4 totalAccumulatedInServceTime (TTZ)=10

Network.findMinTtzCircuitCandidates: bestCircuitCandidates=[C] ERC=1

CLF=0.6666666666666666

Network.generateCircuitMigrationPlan: Step=3 migrateCircuits=[C]

numInServiceNodes=3 totalAccumulatedInServceTime (TTZ)=13

Network.generateCircuitMigrationPlan: Step=4 migrateCircuits=[A]

numInServiceNodes=0 totalAccumulatedInServceTime(TTZ)=13
Network.generateCircuitMigrationPlan: Migration completes in 4 steps.
totalAccumulatedInServceTime(TTZ)=13

In a network modernization operation on more typical scale, an existing network may include 750 end-to-end circuits to be migrated to a new network. In this example, it may be impossible to determine an optimal circuit migration sequence using exhaustive searching due to the exponential increase in the search space, when compared to the simplified example shown in FIGS. 3A-3E and 4A-4E. However, an example migration sequence generator was able to identify an optimal circuit migration sequence for this existing network in approximately four seconds. More specifically, the use of an example migration sequence generator that iteratively calculates and compares ERC and CLF scores for all end-to-end circuits in an existing network to minimize TTZ reduces the search space from exponential to linear and generates a solution in near real time. A portion of an example migration sequence generator output for this existing network is shown below.

. . .
Network.generateCircuitMigrationPlan: numCircuitsMigrationPerStep=1
Network.generateCircuitMigrationPlan: Step=0 numInServiceNodes=23
Network.findMinTtzCircuitCandidates: bestCircuitCandidates=[588] ERC=0 CLF=28.0
Network.generateCircuitMigrationPlan: Step=1 migrateCircuits=[588]
numInServiceNodes=23 totalAccumulatedInServceTime(TTZ)=23
Network.findMinTtzCircuitCandidates: bestCircuitCandidates=[514] ERC=0 CLF=45.8
Network.generateCircuitMigrationPlan: Step=2 migrateCircuits=[514]
numInServiceNodes=23 totalAccumulatedInServceTime(TTZ)=46
Network.findMinTtzCircuitCandidates: bestCircuitCandidates=[507] ERC=0 CLF=49.0
Network.generateCircuitMigrationPlan: Step=3 migrateCircuits=[507]
numInServiceNodes=23 totalAccumulatedInServceTime(TTZ)=69
Network.findMinTtzCircuitCandidates: bestCircuitCandidates=[506] ERC=0 CLF=56.333333333333336
Network.generateCircuitMigrationPlan: Step=4 migrateCircuits=[506]
numInServiceNodes=23 totalAccumulatedInServceTime(TTZ)=92
Network.findMinTtzCircuitCandidates: bestCircuitCandidates=[508] ERC=0 CLF=55.333333333333336
Network.generateCircuitMigrationPlan: Step=5 migrateCircuits=[508]
numInServiceNodes=23 totalAccumulatedInServceTime(TTZ)=115
. . .
Network.findMinTtzCircuitCandidates: bestCircuitCandidates=[745] ERC=0 CLF=2.0
Network.generateCircuitMigrationPlan: Step=747 migrateCircuits=[745]
numInServiceNodes=2 totalAccumulatedInServceTime(TTZ)=8988
Network.findMinTtzCircuitCandidates: bestCircuitCandidates=[746] ERC=1 CLF=1.0
Network.generateCircuitMigrationPlan: Step=748 migrateCircuits=[746]
numInServiceNodes=1 totalAccumulatedInServceTime(TTZ)=8989
Network.findMinTtzCircuitCandidates: bestCircuitCandidates=[697] ERC=0 CLF=1.0
Network.generateCircuitMigrationPlan: Step=749 migrateCircuits=[697]
numInServiceNodes=1 totalAccumulatedInServceTime(TTZ)=8990
Network.generateCircuitMigrationPlan: Step=750 migrateCircuits=[703]
numInServiceNodes=0 totalAccumulatedInServceTime(TTZ)=8990
Network.generateCircuitMigrationPlan: Migration completes in 750 steps.
totalAccumulatedInServceTime(TTZ)=8990

The performance of the techniques disclosed herein, in terms of TTZ, has been compared to that of two reference algorithms for generating a circuit migration sequence. In the first reference algorithm, at each step, the next circuit removal candidate is selected sequentially from the original list of end-to-end circuits for the existing network. In other words, the order of circuits in the circuit migration list matches the order of the circuits in the original circuit list, regardless of how the original circuit list was generated. In the second reference algorithm, at each step, the next circuit removal candidate is selected randomly from the original list of end-to-end circuits for the existing network. Table 1 below illustrates the performance of each approach for the simplified example shown in FIGS. 3A-3E and 4A-4E and for a more typical existing network that includes 750 end-to-end circuits, as described above.

TABLE 1

Comparison of Total TTZ for Multiple Techniques

| Approach | Simplified Example | Typical Example |
| --- | --- | --- |
| Disclosed Tool | 13 | 8990 |
| First Reference | 18 | 12464 |
| Second Reference | 16 | 17058 |

As shown in Table 1, the disclosed techniques for circuit migration sequence generation achieved a TTZ score of 8990 for the typical example, representing a 28% reduction in TTZ when compared to the first reference technique (with a TTZ of 12464), and a 47% reduction in TTZ when compared to the second reference technique (with a TTZ of 17058). For the simplified example, the disclosed techniques for circuit migration sequence generation achieved a TTZ score of 13, representing a 28% reduction in TTZ when compared to the first reference technique (with a TTZ of 18), and a 19% reduction in TTZ when compared to the second reference technique (with a TTZ of 16).

Figure 7:
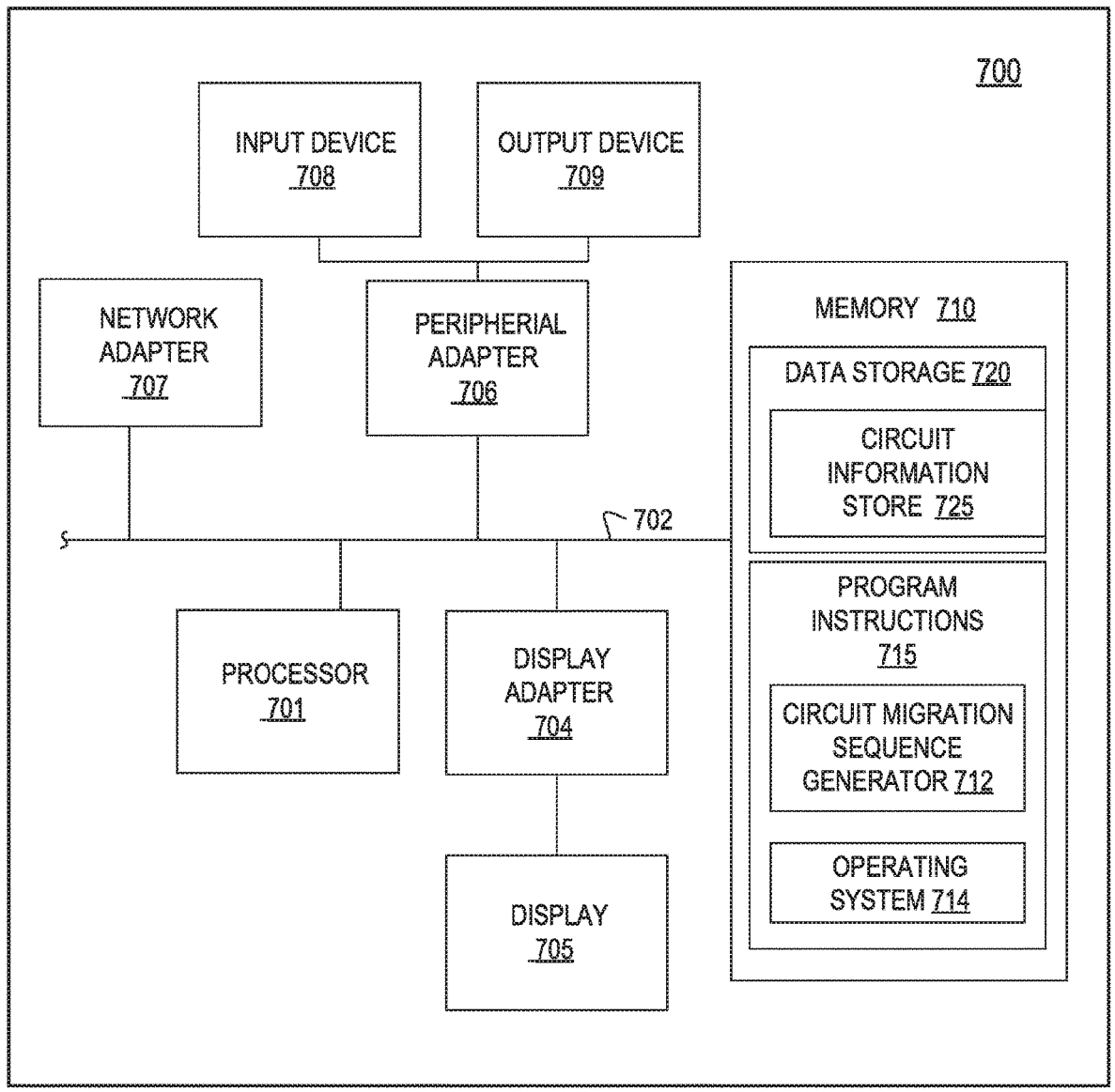
FIG. 7 is a block diagram illustrating selected elements of an example network management controller, according to some embodiments.

Referring now to FIG. 7, a block diagram illustrating selected elements of an example network management controller 700 is presented. In FIG. 7, network management controller 700 is represented as a computer system including physical and logical components for automatically generating a circuit migration sequence for modernizing an existing network, as described herein, and/or for controlling aspects of the execution of the circuit migration sequence, and is a schematic diagram for descriptive purposes. Accordingly, network management controller 700 includes, among other elements, processor 701 coupled via shared bus 702 to storage media collectively identified as memory 710. Processor 701 may represent one or more individual processing units and may execute program instructions, interpret data, and/or process data stored by memory 710. It is noted that network management controller 700 may be implemented differently in different embodiments. For example, in some embodiments, network management controller 700 may be implemented using a network node. In some embodiments, network management controller 700 may be implemented as a computer system owned or operated by a network management service provider that provides network modernization services or that provides circuit migration sequences for use in network modernization operations using the techniques described herein.

Network management controller 700, as depicted in FIG. 7, further includes network adapter 707 that interfaces network management controller 700 to a network (not shown in FIG. 7), and peripheral adapter 706, which provides connectivity for the use of input device 708 and output device 709. Input device 708 may represent a device for user input, such as a keyboard or a mouse, a touch panel, a microphone, or a camera, among others. Output device 709 may represent a device for providing signals or indications to a user, such as loudspeakers for generating audio signals, among others.

Network management controller 700 is shown in FIG. 7 including display adapter 704 and further includes a display device shown as display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as VGA, XGA, etc., or digital standards such as DVI, HDMI, among others. A television display may comply with standards such as NTSC (National Television System Committee), PAL (Phase Alternating Line), or another suitable standard. Display 705 may include an output device 709, such as one or more integrated speakers to play audio content, or may include an input device 708, such as a microphone or video camera or touch panel, in various implementations.

In FIG. 7, memory 710 may comprise a system, device, or apparatus suitable to retain program instructions or data for a period of time (e.g., computer-readable media). In various embodiments, memory 710 may encompass persistent and/or volatile media, fixed and/or removable media, and magnetic and/or semiconductor media. For example, memory 710 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 710 may include different numbers of physical storage devices, in various embodiments.

Memory 710 includes computer-readable memory media operable to store instructions, data, or both. For example, memory 710, which may be non-transitory memory media, includes data storage 720, which includes a circuit information store 725 for storing information about the circuits of an existing network for which a network modernization operation is to be performed. Memory 710 also includes program instructions 715 which, as shown, includes sets or sequences of instructions, namely, an operating system 714, and circuit migration sequence generator 712. Operating system 714 may be a UNIX or UNIX-like operating system, a Windows® family operating system, or another suitable operating system. In particular embodiments, memory 710 may also store program instructions executable to implement include functionality for network intelligence and control and may comprise applications (or software modules) that support the ability to establish network services, including applications or modules for discovery, routing, path computation, signaling, and other functions (not shown in FIG. 7). These additional program instructions may allow network management controller 700 to control aspects of the execution of the circuit migration sequence, once generated.

Circuit migration sequence generator 712 may implement at least some of the operations of method 500 illustrated in FIG. 5 and/or method 600 illustrated in FIG. 6. For example, when executed by processor 701, circuit migration sequence generator 712 may be operable to perform, among other actions, obtaining a list of end-to-end circuits carried in a given circuit-switched network, calculating, for each of the circuits on the list, a respective early retirement credit (ERC) score representing a number of zero-fill circuit-switching units that would remain in the given network as a result of removal of the circuit and a respective circuit load factor (CLF) score representing an average number of circuits that would be carried on each circuit-switching unit currently traversed by the circuit following removal of the circuit, selecting, dependent on the respective ERC scores, one of the circuits to migrate to a new network having the highest ERC score among the respective scores for the circuits on the list, where when two or more of the circuits have the same highest ERC score, the selected circuit is the one of the two or more circuits for which the respective CLF score is lowest, adding the selected circuit to a circuit migration sequence for the given network, and removing the selected circuit from the list to produce an updated list of circuits that would be carried in the given network following removal of the selected circuit from the given network.

In various embodiments, network management controller 700 may include more, fewer, or different elements than those illustrated in FIG. 7.

The systems and methods described herein may address the difficulty of generating network-wide circuit migration plans that enable efficient circuit migration at the network level. For example, the disclosed techniques may allow multiple circuit-switching units that are traversed by a single end-to-end circuit to be decommissioned essentially in parallel, rather than on a site-by-site basis. By iteratively evaluating the ERC and CLF scores of all end-to-end circuits in an existing network when generating a circuit migration sequence for a network modernization operation, the network-wide TTZ for the existing network may be minimized, resulting in improved efficiency, fewer equipment failures, and reduced circuit migration time for the network modernization operation.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for network modernization, comprising:
obtaining a first list of a plurality of end-to-end circuits carried in a circuit-switched network, the given circuit-switched network spanning multiple nodes at which circuit-switching equipment resides;
calculating, for each of the end-to-end circuits on the first list, a respective first early retirement credit (ERC) score representing a number of zero-fill circuit-switching units that would remain in the given circuit-switched network as a result of removal of an end-to-end circuit, wherein a zero-fill circuit-switching unit is a circuit-switching unit on which no circuits are carried;
selecting, dependent on the respective first ERC scores, a first one of the end-to-end circuits to migrate to a new network, the first end-to-end circuit having a highest first ERC score among the respective scores for each of the end-to-end circuits on the first list;
adding the first end-to-end circuit to a circuit migration sequence for the given circuit-switched network in a first position; and
removing the first end-to-end circuit from the first list to produce an updated list of end-to-end circuits that would be carried in the given circuit-switched network following removal of the first end-to-end circuit from the given circuit-switched network.

2. The method of claim 1, further comprising:
calculating, for each of the end-to-end circuits on the first list, a respective first circuit load factor (CLF) score representing an average number of circuits that would be carried on each circuit-switching unit currently traversed by the end-to-end circuit following removal of the end-to-end circuit;
wherein when two or more of the end-to-end circuits on the first list have the highest first ERC score, selecting the first one of the end-to-end circuits to migrate to the new network comprises selecting the one of the two or more end-to-end circuits on the first list for which the respective first CLF score is lowest.

3. The method of claim 1, further comprising:
calculating, for each of the end-to-end circuits on the updated list, a respective next ERC score representing a number of zero-fill circuit-switching units that would remain in the given circuit-switched network as a result of removal of the end-to-end circuit;
selecting, dependent on the respective next ERC scores, a next one of the end-to-end circuits to migrate to the new network, the next end-to-end circuit having a highest next ERC score among the respective scores for each of the end-to-end circuits;
adding the next one of the end-to-end circuits to the circuit migration sequence for the given circuit-switched network in a next position; and
removing the next one of the end-to-end circuits from the updated list.

4. The method of claim 3, further comprising:
calculating, for each of the end-to-end circuits on the updated list, a respective next CLF score representing an average number of circuits that would be carried on each circuit-switching unit currently traversed by the end-to-end circuit following removal of the end-to-end circuit;
wherein when two or more of the end-to-end circuits on the updated list have the highest next ERC score, selecting the next one of the end-to-end circuits to migrate to the new network comprises selecting the one of the two or more end-to-end circuits on the updated list for which the respective next CLF score is lowest.

5. The method of claim 3, further comprising:
repeating said calculating, for each of the end-to-end circuits on the updated list, a respective next CLF score, said selecting a next one of the end-to-end circuits to migrate to the new network, said adding the next one of the end-to-end circuits to the circuit migration sequence, and said removing the next one of the end-to-end circuits from the updated list until the updated list is empty.

6. The method of claim 5, further comprising, for each of the end-to-end circuits in the circuit migration sequence and in order of their respective positions in the circuit migration sequence:
replacing circuit-switching units in the end-to-end circuit with new circuit-switching equipment compatible with transmission protocols implemented in the new network; and
connecting the new circuit-switching equipment to the new network.

7. The method of claim 6, wherein:
the given circuit-switched network implements time-division multiplexing; and
the circuit-switching units comprise digital cross-connect system (DCS) units.

8. The method of claim 6, wherein the new network implements multiprotocol label switching.

9. The method of claim 1, wherein obtaining the first list of the plurality of end-to-end circuits carried in the given circuit-switched network comprises receiving information describing the plurality of end-to-end circuits carried in the given circuit-switched network from an owner, operator, or user of the given circuit-switched network.

10. The method of claim 1, wherein obtaining the first list of the plurality of end-to-end circuits carried in the given circuit-switched network comprises:
performing a network discovery operation targeting the given circuit-switched network; and
creating the first list based on results of the network discovery operation.

11. The method of claim 1, wherein two or more of the multiple nodes spanned by the given circuit-switched network are co-located.

12. The method of claim 1, wherein at least two of the multiple nodes spanned by the given circuit-switched network reside at different physical locations.

13. A system for circuit migration sequence generation for network modernization, comprising:
a processor; and
memory media storing program instructions that when executed by the processor cause the processor to:
obtain a first list of a plurality of end-to-end circuits carried in a given circuit-switched network, the given circuit-switched network spanning multiple nodes at which circuit-switching equipment resides;
calculate, for each of the end-to-end circuits on the first list, a respective first early retirement credit (ERC) score representing a number of zero-fill circuit-switching units that would remain in the given circuit-switched network as a result of removal of the end-to-end circuit, wherein a zero-fill circuit-switching unit is a circuit-switching unit on which no circuits are carried;

select, dependent on the respective first ERC scores, a first one of the end-to-end circuits to migrate to a new network, the first end-to-end circuit having a highest first ERC score among the respective scores for each of the end-to-end circuits on the first list;

add the first end-to-end circuit to a circuit migration sequence for the given circuit-switched network in a first position; and remove the first end-to-end circuit from the first list to produce an updated list of end-to-end circuits that would be carried in the given circuit-switched network following removal of the first end-to-end circuit from the given circuit-switched network.

14. The system of claim 13, wherein when executed by the processor, the program instructions further cause the processor to:

calculate, for each of the end-to-end circuits on the first list, a respective first circuit load factor (CLF) score representing an average number of circuits that would be carried on each circuit-switching unit currently traversed by the end-to-end circuit following removal of the end-to-end circuit;

wherein when two or more of the end-to-end circuits on the first list have the highest first ERC score, selecting the first one of the end-to-end circuits to migrate to the new network comprises selecting the one of the two or more end-to-end circuits on the first list for which the respective first CLF score is lowest.

15. The system of claim 13, wherein when executed by the processor, the program instructions further cause the processor to:

calculate, for each of the end-to-end circuits on the updated list, a respective next ERC score representing a number of zero-fill circuit-switching units that would remain in the given circuit-switched network as a result of removal of the end-to-end circuit;

select, dependent on the respective next ERC scores, a next one of the end-to-end circuits to migrate to the new network, the next end-to-end circuit having a highest next ERC score among the respective scores for each of the end-to-end circuits;

add the next one of the end-to-end circuits to the circuit migration sequence for the given circuit-switched network in a next position; and remove the next one of the end-to-end circuits from the updated list.

16. The system of claim 15, wherein when executed by the processor, the program instructions further cause the processor to:

calculate, for each of the end-to-end circuits on the updated list, a respective next CLF score representing an average number of circuits that would be carried on each circuit-switching unit currently traversed by the end-to-end circuit following removal of the end-to-end circuit;

wherein when two or more of the end-to-end circuits on the updated list have the highest next ERC score, selecting the next one of the end-to-end circuits to migrate to the new network comprises selecting the one of the two or more end-to-end circuits on the updated list for which the respective next CLF score is lowest.

17. The system of claim 15, wherein when executed by the processor, the program instructions further cause the processor to repeat, until the updated list is empty:

calculating, for each of the end-to-end circuits on the updated list, a respective next CLF score;

selecting a next one of the end-to-end circuits to migrate to the new network;

adding the next one of the end-to-end circuits to the circuit migration sequence; and removing the next one of the end-to-end circuits from the updated list.

18. The system of claim 13, wherein:

the given circuit-switched network implements time-division multiplexing;

the circuit-switching units comprise digital cross-connect system (DCS) units; and the new network implements multiprotocol label switching.

19. The system of claim 13, wherein to obtain the first list of the plurality of end-to-end circuits carried in the given circuit-switched network, the program instructions cause the processor to receive information describing the plurality of end-to-end circuits carried in the given circuit-switched network from an owner, operator, or user of the given circuit-switched network.

20. The system of claim 13, wherein to obtain the first list of the plurality of end-to-end circuits carried in the given circuit-switched network, the program instructions cause the processor to:

initiate a network discovery operation targeting the given circuit-switched network; and create the first list based on results of the network discovery operation.

* * * * *